(12) United States Patent
Bak et al.

(10) Patent No.: US 8,244,775 B1
(45) Date of Patent: Aug. 14, 2012

(54) USING MAP OBJECTS TO ACCESS OBJECT PROPERTIES IN A DYNAMIC OBJECT-ORIENTED PROGRAMMING LANGUAGE

(75) Inventors: Lars Bak, Tranbjerg J. (DK); Kasper Verdich Lund, Hoejbjerg (DK)

(73) Assignee: Google Inc, Mountain View, CA (US)

(*) Notice: Subject to any disclaimer, the term of this patent is extended or adjusted under 35 U.S.C. 154(b) by 1088 days.

(21) Appl. No.: 12/120,067

(22) Filed: May 13, 2008

(51) Int. Cl.
*G06F 17/30* (2006.01)

(52) U.S. Cl. .................. 707/802; 707/756; 707/955

(58) Field of Classification Search .......... 707/756, 707/807, 802, 955
See application file for complete search history.

(56) References Cited

U.S. PATENT DOCUMENTS

| | | | |
|---|---|---|---|
| 6,272,672 | B1* | 8/2001 | Conway ............... 717/107 |
| 2006/0242654 | A1 | 10/2006 | Lund et al. |
| 2009/0106267 | A1* | 4/2009 | Bumgarner et al. ........ 707/10 |

OTHER PUBLICATIONS

Chambers et al., "An Efficient Implementation of SELF, a Dynamically-Typed Object-Oriented Language Based on Prototypes", ACM SIGPLAN Notices, vol. 24, Issue 10, Oct. 1989, Special issue: Proceedings of the 1989 ACM OOPSLA conference on object-oriented programming, published 1989, pp. 49 to 70.

* cited by examiner

*Primary Examiner* — Shahid Alam
(74) *Attorney, Agent, or Firm* — Sterne, Kessler, Goldstein and Fox P.L.L.C.

(57) ABSTRACT

One embodiment of the present invention provides a system that uses map objects to access object properties for a program written in a dynamic object-oriented programming language, thereby facilitating property access for languages that allow additional properties to be defined for objects at runtime. During operation, the system receives an object of an object type. This object is associated with a memory region and a given map object (from a set of map objects associated with the given object type) that describes how properties of the object are mapped to fields in the memory region. When receiving a request to access a property of the object, the system determines whether the given map object includes a field mapping for the property. If so, the system accesses a field in the memory region associated with the property using the field mapping.

9 Claims, 12 Drawing Sheets

USING MAP OBJECTS TO ACCESS OBJECT PROPERTIES IN A DYNAMIC OBJECT-ORIENTED PROGRAMMING LANGUAGE

RELATED APPLICATION

The subject matter of this application is related to the subject matter in a co-pending non-provisional application by the same inventors as the instant application and filed on the same day as the instant application entitled, "Supporting Efficient Access to Object Properties in a Dynamic Object-Oriented Programming Language," having Ser. No. 12/120,077, and filing date 13 May 2008.

BACKGROUND

1. Field of the Invention

The present invention relates to techniques for accessing object properties in an object-oriented programming language. More specifically, the present invention relates to a method and an apparatus for using map objects to access properties of an object in a dynamic object-oriented programming language that allows additional properties to be defined for objects during execution.

2. Related Art

Dynamic object-oriented programming languages facilitate extending program code and/or objects during program execution, thereby providing substantial flexibility to program developers. However, because object properties can change at runtime, accessing object properties in dynamic object-oriented programming languages can involve a large number of slow, dynamic lookup operations. For instance, many runtime environments locate a property for an object by performing a time-consuming dictionary-lookup operation, which can cause the object property lookup operation to become a major performance bottleneck.

Hence, what is needed is a method and an apparatus that facilitates accessing object properties in dynamic object-oriented programming languages without the above-described limitations.

SUMMARY

One embodiment of the present invention provides a system that uses map objects to access object properties for a program written in a dynamic object-oriented programming language, thereby facilitating property access for languages that allow additional properties to be defined for objects at runtime. During operation, the system receives an object. This object is associated with a memory region and a given map object (from a set of map objects associated with the same object type, where objects created from the same constructor function have the same object type) that describes how properties of the object are mapped to fields in the memory region. When receiving a request to access a property of the object, the system determines whether the given map object includes a field mapping (e.g., field location information stored in the map object) for the property. If so, the system accesses a field in the memory region associated with the property using the field mapping.

In some embodiments, a set of map objects for a given object type may be arranged hierarchically using a set of map transitions based on the order in which properties are defined for one or more objects of the given object type. Note that while in some embodiments the fields in the memory region may be ordered based on the order in which their associated properties are defined for the object, in alternate embodiments the fields in the memory region may be arranged otherwise.

In some embodiments, if a given map object associated with an object does not include a mapping for a property, the system determines a descendant map object of the given map object that maps the property to a new field in the memory region. The system updates the object to be associated with this descendant map object, and then accesses the new field associated with the property using the mapping in the descendant map object.

In some embodiments, the descendant map object is a direct descendant of the given map object, and includes substantially the same field mappings, perhaps in substantially the same order, as the given map object. However, the descendant map object also includes an additional field mapping that has been appended to the field mappings defined for the given map object.

In some embodiments, if no direct descendant of the given map object includes a mapping for the property, the system allocates a new map object that defines a new field for the property in the memory region following the fields previously defined for the properties of the given map object. The system adds the new map object to the hierarchical set of map objects as a direct descendant of the given map object (e.g., creating a map transition from the given map object to the new map object), and then updates the object to be associated with the new map object.

In some embodiments, the system may allocate only a limited number of map objects for a given object type. The system detects when the number of properties and/or map objects defined for the object exceeds a given limit, and then uses a dictionary-storage technique, instead of the set of map objects, to facilitate accessing object properties. In such embodiments, the system may access property-value pairs from a dictionary structure associated with an object and/or object type when accessing properties for the object.

In some embodiments, the system re-uses existing map objects instead of allocating new map objects when additional objects of the given object type access properties in the same order as a previous object. By sharing map objects across one or more objects, the system facilitates improving performance via inline caching.

In some embodiments, the system uses the set of map objects to predict a typical number of properties expected for a given object type, thereby facilitating choosing an initial size for the memory region.

DETAILED DESCRIPTION

Figure 1:
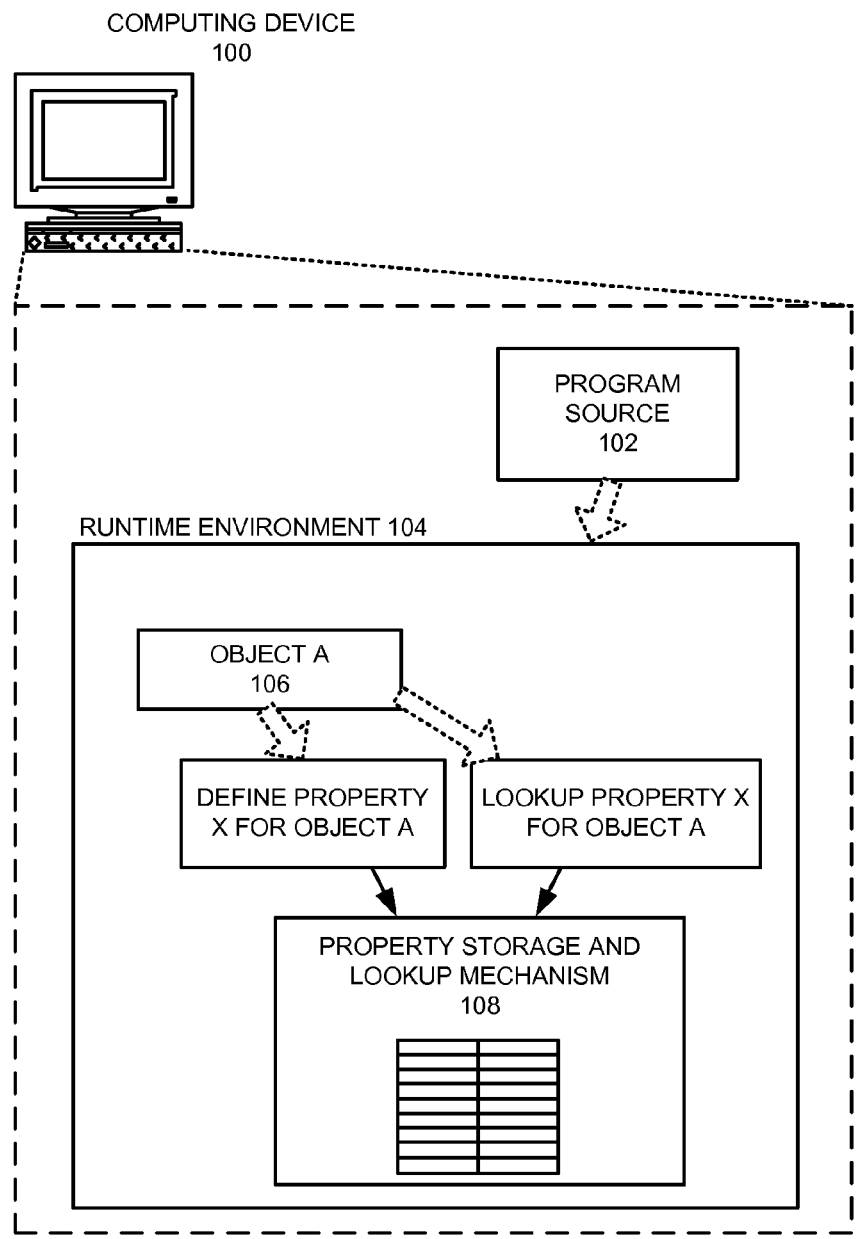
FIG. 1 illustrates an exemplary environment in which a program written in a dynamic programming language executes on a computing device in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Dynamic Object-Oriented Programming Languages

Dynamic object-oriented programming languages facilitate extending program code and/or objects during execution. These capabilities can provide substantial flexibility and power to program developers, but may sometimes cause performance problems. Statically-typed programming languages enable a compiler to statically determine at compile time an associated field offset into a memory region for a given object property accessed during execution. However, because object properties may vary on a per-object basis in a dynamically-typed programming language, a runtime environment for such a language typically needs to perform additional operations to confirm that a given property is actually defined for a given object and to determine the specific memory field associated with a stored value of the property for the object.

For instance, programs written in JavaScript™ (the term JavaScript is a trademark of Sun Microsystems, Inc. of Santa Clara, Calif.), a dynamic object-oriented programming language, often run slowly due in part to the dynamic nature of the language. Because JavaScript programs typically include relatively minimal static information, the runtime environment often cannot immediately determine from the program code how many properties program objects have. As a result, many JavaScript implementations use a dictionary-like data structure for storing object property values. For example, given an object 'A', if a program attempts to access "A.f" (e.g., determine the value of the property 'f' for object 'A'), a typical JavaScript runtime implementation retrieves a dictionary data structure associated with the given object, and then retrieves the desired property (in this case, 'f') in that dictionary data structure. Note that this lookup procedure can be computationally expensive compared to accessing an object field in a static language such as C or C++. In such static languages, a compiler can statically determine the offset of a field for a property during code generation, thereby allowing the program code to simply dereference the object and then directly access a value stored at the given offset using a very small number of instructions (e.g., as few as one instruction). In contrast, a typical dictionary lookup for a dynamic property can involve: retrieving the given object; computing a hash value for the name of the specified property; finding a matching index for the hash value in the dictionary; comparing a key for an entry found in the hash table with the hash value to determine whether the entry matches the desired property; and then accessing the value for the property. The process of performing a dictionary lookup involves substantially more instructions than property lookups in static languages, and presents a significant performance penalty for dynamic programming languages such as JavaScript.

FIG. 1 illustrates an exemplary environment in which a program written in a dynamic programming language executes on computing device 100. During operation, program source 102 for the program is loaded into runtime environment 104. Program source 102 defines and performs a number of operations upon Object A 106. For instance, during operation, the program may define a property 'X' for Object A 106, and then subsequently retrieve the value of property X for Object A 106. The definition and access of properties is managed by a property storage and lookup mechanism 108 that determines whether a given property is defined for Object A 106. For instance, in many typical implementations of runtime environments for dynamic programming languages, property storage and lookup mechanism 108 involves a per-object dictionary lookup mechanism.

One embodiment of the present invention facilitates property access in dynamic object-oriented programming languages by using map objects to access object properties.

Accessing Object Properties Using Map Objects

Property access is a common operation in programming languages; hence, a runtime environment for a programming language typically seeks to ensure that property access is fast. However, because dynamic programming languages allow dynamic definition of properties, system designers do not know in advance how many properties a given object or object type will have. One embodiment of the present invention ensures that object representations can be extended during program execution using indirection. The system dynamically computes a set of "map objects" and "map transitions" linking such map objects to facilitate fast and efficient property access in dynamic object-oriented systems.

In one embodiment of the present invention, objects in the program are a constant size, and include: (1) a pointer to a "backing store" for each given object (i.e., a per-object memory region allocated by the system for the storage of property values for the given object); and (2) a pointer to a map object, where the map object describes the layout of data fields in the backing store for any objects associated with the map object. Such map objects can be pointed to (e.g., shared) by multiple objects, and capture the format of the object. For instance, a map object can include the names of properties and the offset in the backing store of stored values for the named properties. The system uses such shared map objects during operation to define, store, and access object properties.

FIGS. 2A-2C, 3A-3C, and 4A-4C illustrate a number of exemplary property accesses using map objects.

Figure 2A:
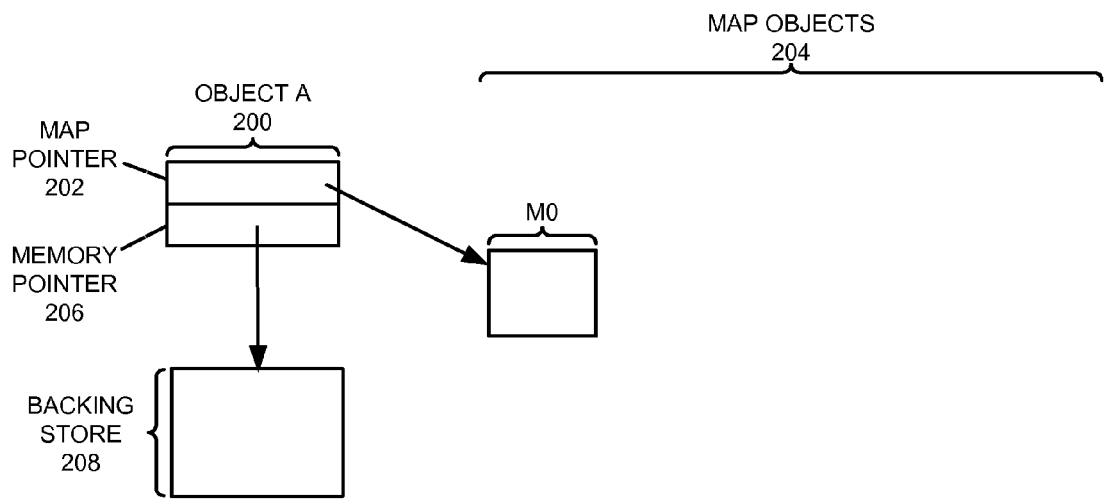
FIG. 2A illustrates an object with a map pointer and a memory pointer in accordance with an embodiment of the present invention.

FIG. 2A illustrates an object, Object A 200, that includes a map pointer 202 that points to a map object (M0) in a set of map objects 204 and a memory pointer 206 that points to a backing store 208 for Object A 200. At the time Object A 200 is created, the object has no defined properties; hence the initial map object M0 is an empty map associated with the given object type for Object A 200. When a property (e.g., property 'X') is accessed for an object of a given object type (where objects created from the same constructor function have the same object type), the system checks whether the map object for the object includes information for accessing the specified property. For instance, if an object attempts to assign a value to a property, the system checks if the property is defined in the map object. If so, the system can use the information specified in the map object to store a value for the property in backing store 208 (e.g., by storing the value for the property at an offset into the backing store that is specified in the map object). If the property is undefined in the map object, in contrast to adding the property to a dictionary for the object (as in existing systems), the system instead creates a new map object that defines the specified property. For instance, the system can dynamically copy the initial map object (M0) into a new map object (M1) and then extend this new map object to include information specifying how to access a field in the backing store that will now be associated with the specified property. Then, the system creates a "map transition" (or pointer) for the name of the property from the original map object to the new map object.

Figure 2B:
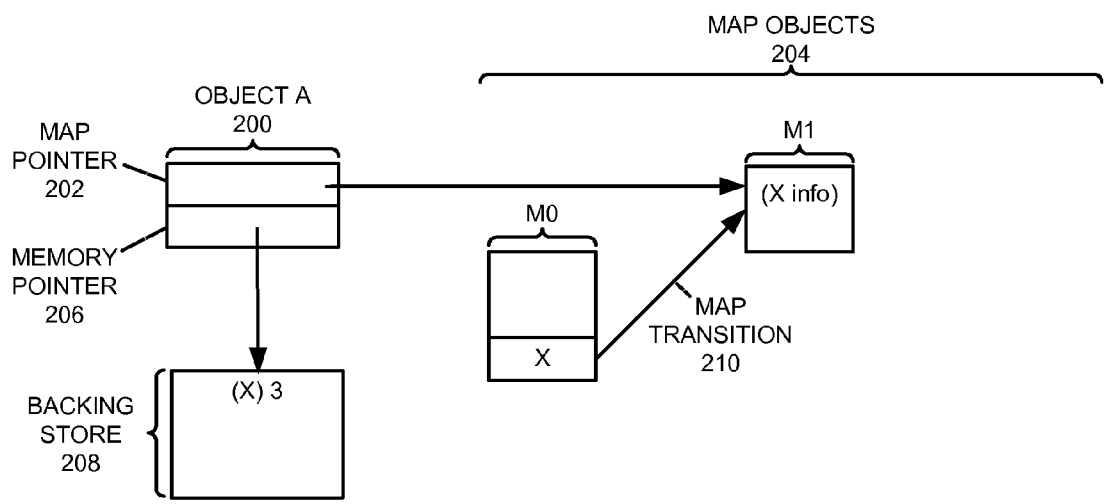
FIG. 2B illustrates the object of FIG. 2A after an initial property has been accessed in accordance with an embodiment of the present invention.

FIG. 2B illustrates the outcome of defining a property X for Object A 200. Previously (in FIG. 2A), map pointer 202 for Object A 200 pointed to map object M0, a root object for the object type (or class) of Object A 200, which included no properties. Upon reaching a statement that creates or accesses property X for Object A 200 (e.g., the statement "A.X=3"), the system determines that map object M0 does not define the property X (as shown in FIG. 2A), and proceeds to create a copy of map object M0 (shown as map object M1) that includes information for accessing property X in backing store 208. Map object M0 is extended to include the name of the property ('X') and a map transition for this name to the new map object (M1), and map pointer 202 for Object A 200 is then updated to point to map object M1 instead of map object M0. The system then uses the information specified in map object M1 to write the specified value ('3') into backing store 208 of Object A 200 at the location specified for property X (specifically, in the first field of backing store 208).

Figure 2C:
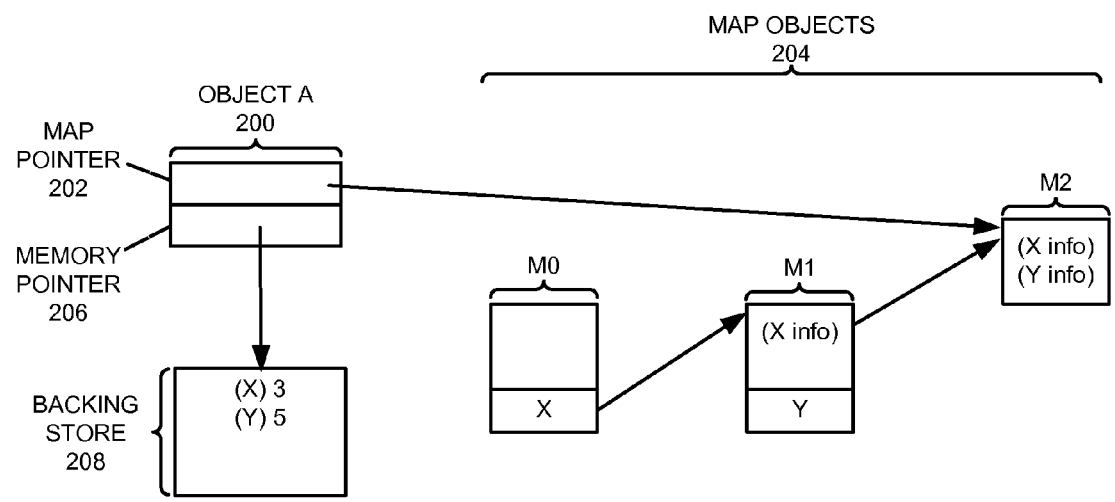
FIG. 2C illustrates the object of FIG. 2B after a second property has been accessed in accordance with an embodiment of the present invention.

FIG. 2C illustrates the outcome of defining an additional property, property Y, for Object A 200. Previously, map pointer 202 pointed to map object M1, which includes information for accessing only one property, X. Upon reaching a statement that creates or accesses a second property for Object A 200 (e.g., the statement "A.Y=5"), the system determines that map object M1 does not define the property Y (as shown in FIG. 2B), and proceeds to create a copy of map object M1 (shown as map object M2) that includes information for accessing both the previous property X as well as the additional property 'Y' in backing store 208. Map object M1 is extended to include the name of the new property ('Y') and a map transition for this name to the new map object (M2), and map pointer 202 is then updated to point to map object M2 instead of map object M1. The system then uses the information specified in map object M2 to write the specified value ('5') into backing store 208 of Object A 200 at the location specified for property Y (e.g., in the second field of backing store 208).

Figure 3A:
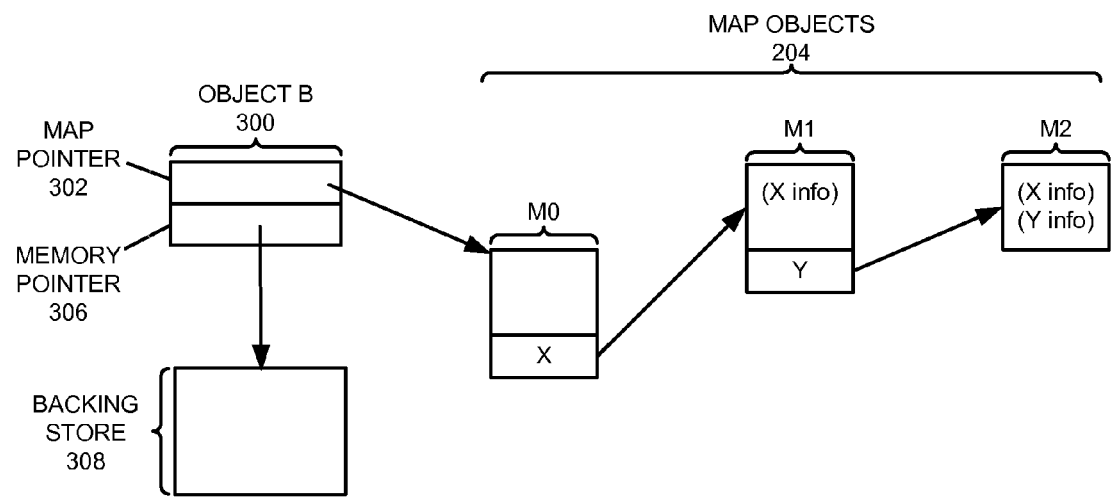
FIG. 3A illustrates a second object that is allocated following the creation of the map objects shown in FIGS. 2A-2C in accordance with an embodiment of the present invention.

FIG. 3A illustrates a second object, Object B 300, of the same object type as Object A 200, some time after the operations described for FIGS. 2A-2C. At creation time, Object B 300 includes no defined properties; hence, the backing store 308 pointed to by memory pointer 306 is empty, and map pointer 302 points to the root map object (M0) in the set of map objects 204 associated with the object type.

Figure 3B:
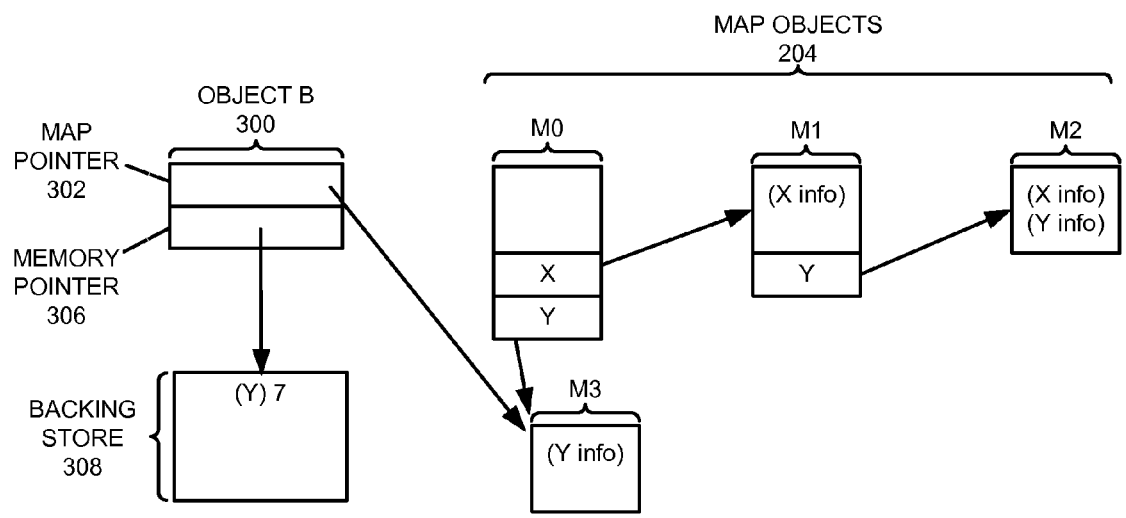
FIG. 3B illustrates the second object of FIG. 3A after an initial property has been accessed in an embodiment of the present invention.

FIG. 3B illustrates the outcome of defining a first property, property Y, for Object B 300. Upon reaching a statement that creates or accesses property Y for Object B 300 (e.g., the statement "B.Y=7"), the system determines that map object M0 does not include information for property Y and only includes a map transition for the property X (as shown in FIG. 3A). The system proceeds to create a copy of map object M0 (shown as map object M3) that includes information for accessing property Y in backing store 308. Map object M0 is further extended to include the name of the property ('Y') and a map transition from this name to the new map object (M3), and map pointer 302 is then updated to point to map object M3 instead of map object M0. The system then uses the information specified in map object M3 to write the specified value ('7') into backing store 308 of Object B 300 at the location specified for property Y. Note that while information for storing a property Y is also present in map object M2, this information relates to a backing store layout in which a property X has been defined first for an object, and a property Y is defined second for an object, which does not apply for Object B 300. While an alternative approach might try to allocate space in the backing store for every possible property for a given object type, this can be very inefficient and unnecessary (depending on actual program execution). Hence, one embodiment of the present invention allocates space for properties in the backing store on an as-needed basis. As a result, there may be different map objects and backing-store organizations for two objects of a given type that both have the properties X and Y, but define them in different order.

Figure 3C:
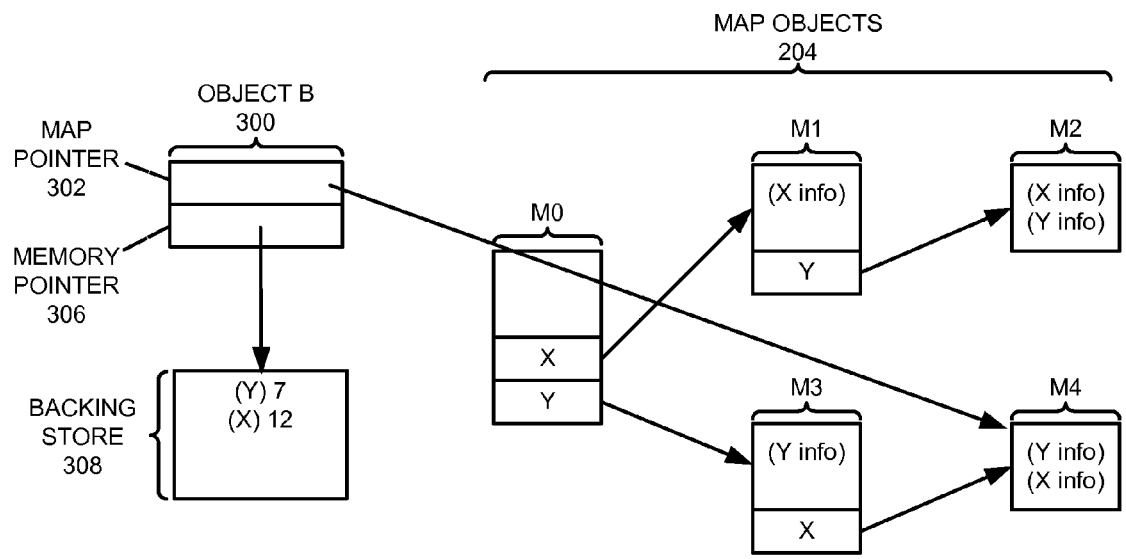
FIG. 3C illustrates the second object of FIG. 3B after a second property has been accessed in an embodiment of the present invention.

FIG. 3C illustrates the outcome of defining the additional property X for Object B 300 (following the example operations in FIGS. 3A-3B). Upon subsequently reaching a statement that stores a value for property X for Object B 300 (e.g., the statement "B.X=12"), the system determines that map object M3 does include information for accessing property X or a map transition for property X (as shown in FIG. 3B), and proceeds to copy map object M3 into a new map object, M4, that includes information for accessing both the previous property Y as well as the additional property X in backing store 308. Map object M3 is extended to include the name of the new property ('X') and a map transition from this name to the new map object (M4), and map pointer 302 for Object B 300 is then updated to point to map object M4 instead of map object M3. The system then uses the information specified in map object M4 to write the specified value ('12') into backing store 308 of Object B 300 at the location specified for property X. Note that while backing store 308 (in FIG. 3C) and backing store 208 (in FIG. 2C) both include values for properties X and Y, because of the inverted order of access, these properties are stored in different order in the respective backing stores.

Figure 4A:
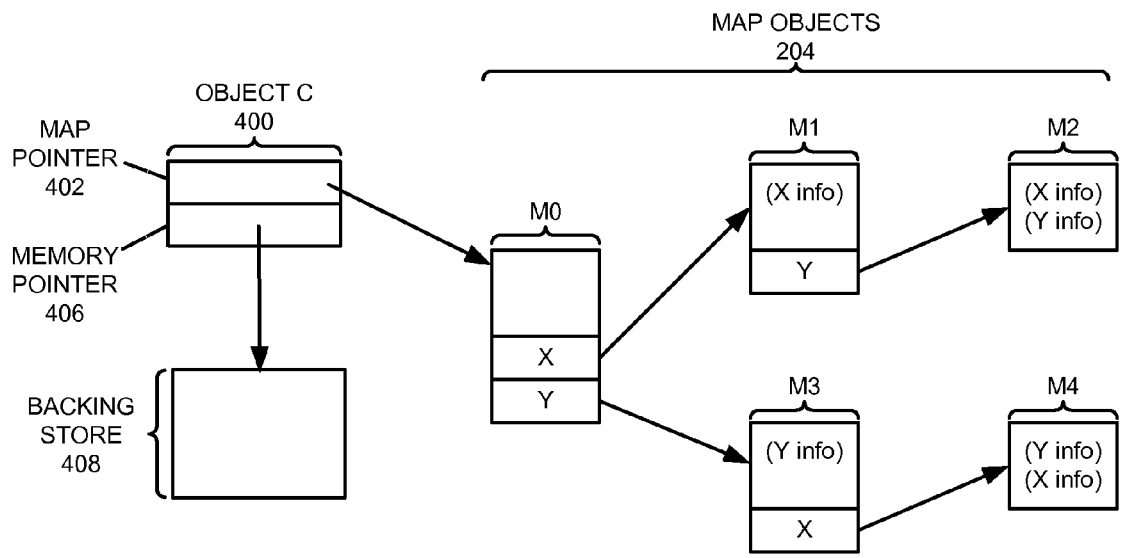
FIG. 4A illustrates a third object that is allocated following the creation of the map objects shown in FIGS. 2A-3C in accordance with an embodiment of the present invention.

FIG. 4A illustrates a third object, Object C 400, of the same object type as Objects A 200 and B 300, some time subsequent to the operations described for FIGS. 2A-2C and 3A-3C. At creation time, as in the previous example, Object C 400 includes no defined properties; hence, initially the backing store 408 pointed to by memory pointer 406 is empty, and map pointer 402 points to the root map object (M0) for the object type.

Figure 4B:
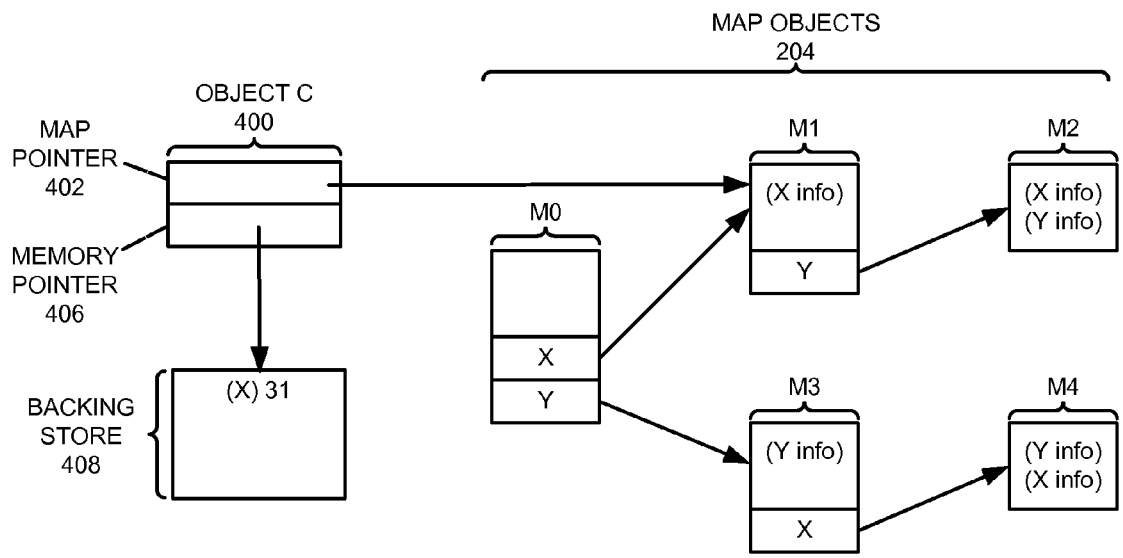
FIG. 4B illustrates the third object of FIG. 4A after an initial property has been accessed in an embodiment of the present invention.

FIG. 4B illustrates the outcome of defining a first property, property X, for Object C 400. Upon reaching a statement that accesses property X for Object C 400 (e.g., the statement "C.X=31"), the system determines that while map object M0 does not include access information for property X, map object M0 does include a map transition for property X that points to map object M1. Hence, the system updates map pointer 402 to point to map object M1, and then uses the information specified in map object M1 to write the specified value ('31') into backing store 408 at the location specified for property X.

Figure 4C:
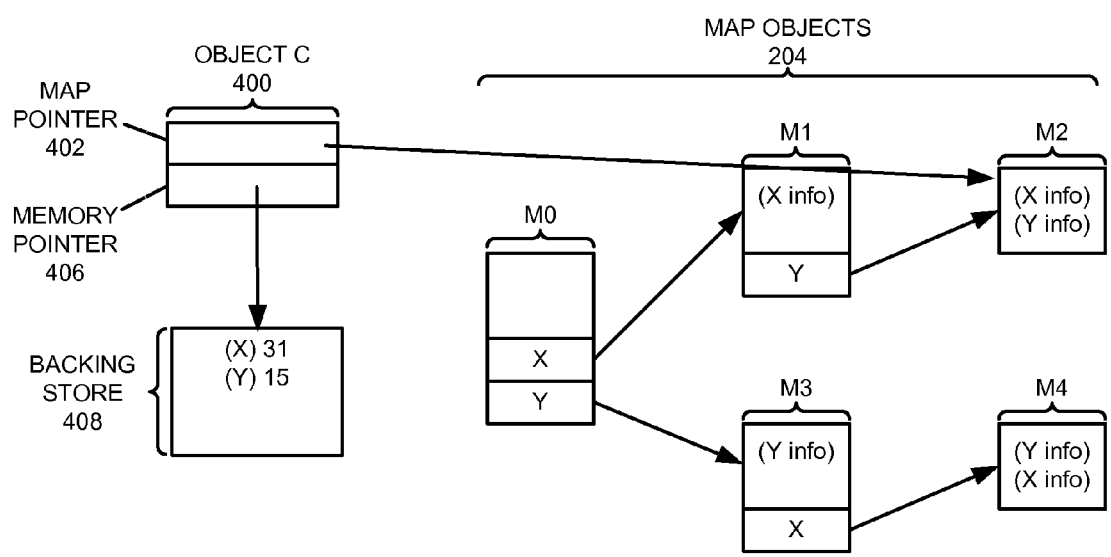
FIG. 4C illustrates the third object of FIG. 4B after a second property is accessed in an embodiment of the present invention.

FIG. 4C illustrates the outcome of defining an additional property Y for Object C 400 (subsequent to the example operations in FIGS. 4A-4B). Upon reaching a statement that accesses property Y for Object C 400 (e.g., the statement "C.Y=15"), the system determines that while map object M1 does not include access information for property Y, map object M1 does include a map transition for property Y that points to map object M2. The system updates map pointer 402 to point to map object M2, and then uses the information specified in map object M2 to write the specified value ('15') into backing store 408 of Object C 400 at the location specified for property Y.

Figure 5:
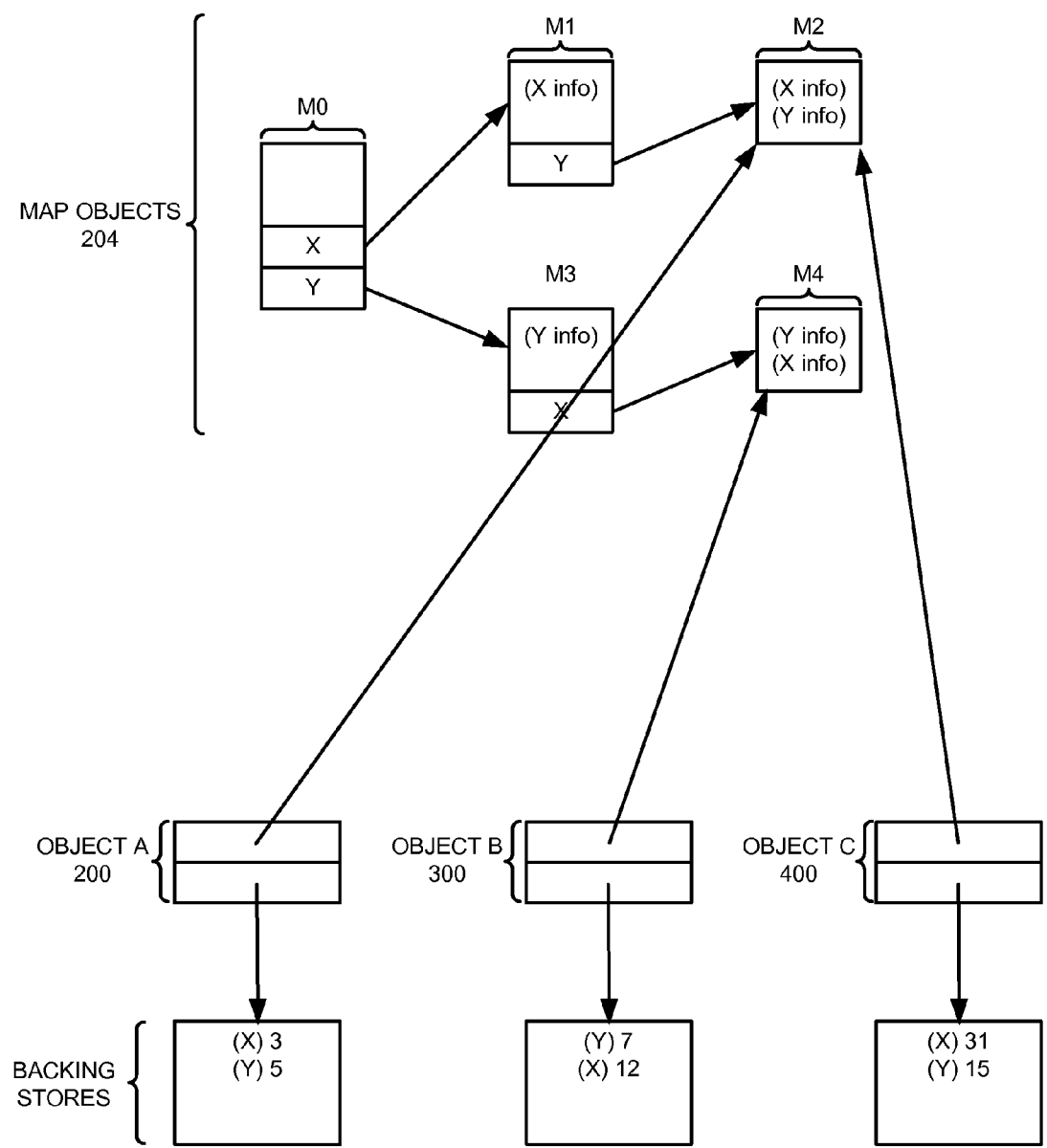
FIG. 5 illustrates the set of objects and map objects resulting from the exemplary operations described for FIGS. 2A-2C, 3A-3C, and 4A-4C in accordance with an embodiment of the present invention.

FIG. 5 illustrates the set of objects and map objects resulting from the exemplary operations described for FIGS. 2A-2C, 3A-3C, and 4A-4C. Object A 200 and Object C 400, which both initially accessed the properties X and Y in the same order, both point to the same (shared) map object, M2, and have values for the two properties defined in the same order in their respective backing stores. Object B 300 evolved differently, accessing properties X and Y in the opposite order, and hence points to map object M4 and stores the properties in the opposite field order.

In one embodiment of the present invention, the system begins with an empty root map object for an object type, and builds a hierarchical tree of map objects linked by map transitions from that root map object based on how properties are accessed (e.g., the order in which properties are defined) for that object type. Whenever a property is added that is not supported by the present map object, the system: (1) checks whether a map transition to another map object exists for that property, (2) if such a map transition exists, follows that transition and uses the resulting information to access data for that property, and (3) if such a map transition does not exist, allocates a new map object and creates a map transition to the new map object from the present map object. Hence, the shape of the tree of map objects unfolds dynamically during execution. If all objects of a given type follow the same path when adding properties, those objects subsequently share the same map object and backing-store organization. For instance, if all objects store point data (e.g., (x,y) coordinates in a coordinate system stored by an object class "Point") and access the properties in the same order, the tree of map objects comprises only a single path, and all of the Point objects share the same leaf map object. Note that in many programs, the program structure ensures that most objects of the same object type will call the same constructor and hence access properties in the same order. As a result, such objects typically share the same property access order and format, thereby ensuring significant sharing of map objects. While some coding styles may add properties in a different order (e.g., using conditional statements in program code to determine how properties are added to objects), such behavior is atypical, making large, inefficient multi-path trees of map objects unlikely.

Note that the described system allows programs to define additional properties for objects during execution. By using a set of map objects linked by map transitions, the system provides a flexible framework of map objects that can be dynamically extended at any time to describe a wide range of object properties.

Note that the number of properties that can be added to an object of a given object type may be bounded by the amount of the space allocated in the backing store. Because a dynamic runtime system cannot predict how many properties may be added to an object, determining an appropriate size for object backing stores can be difficult. If too many properties are added, the system may need to replace and/or perform copy operations for the backing store, to ensure that sufficient space is available. Alternatively, over-allocating memory can obviate the need to extend the backing store during operation, but can be wasteful if the allocated space is not fully used. In one embodiment of the present invention, the system uses prediction techniques to carefully choose the amount of space allocated for the backing store of each object type, to avoid space wastage and undesirable copy operations. For instance, if the system predicts that an object is only likely to ever define four properties, the system may initially allocate four words of memory space for the backing store, and fill in values for the defined properties into this space as needed. In one embodiment of the present invention, the system can tune the size of the backing store allocated for an object type during operation based on an allocated set of map objects for the given object type.

In one embodiment of the present invention, the system detects when a threshold of properties has been defined for a given object (e.g., the number of properties exceeds a specific limit, the available space in the backing store has been exceeded, or a number of map objects allowed for a given object type has exceeded a limit), and then switches to an alternate property storage and lookup mechanism. For instance, if a large number of properties (e.g., 1000) are added for a given object, the system may convert the backing store to a dictionary implementation, so that the size and complexity of the map objects for the object type do not become prohibitive. Creating a "slow object" by reverting to such a technique may result in a performance penalty for such objects, but such objects are uncommon, and by using a dictionary technique the "slow object" case reverts at worst to the same performance as existing techniques. Hence, the system optimizes for the common use case (e.g., objects with relatively few properties), while reverting to the same performance as existing approaches for anomalous objects. Note that the system can substitute such a dictionary approach on a per-object-instance basis. For instance, the system may insert special map objects into the hierarchical set of map objects to indicate a point at which objects should revert to dictionary-lookup for properties, and then only switch to the dictionary technique for specific objects whose property access patterns result in them reaching such special map objects.

Figure 6:
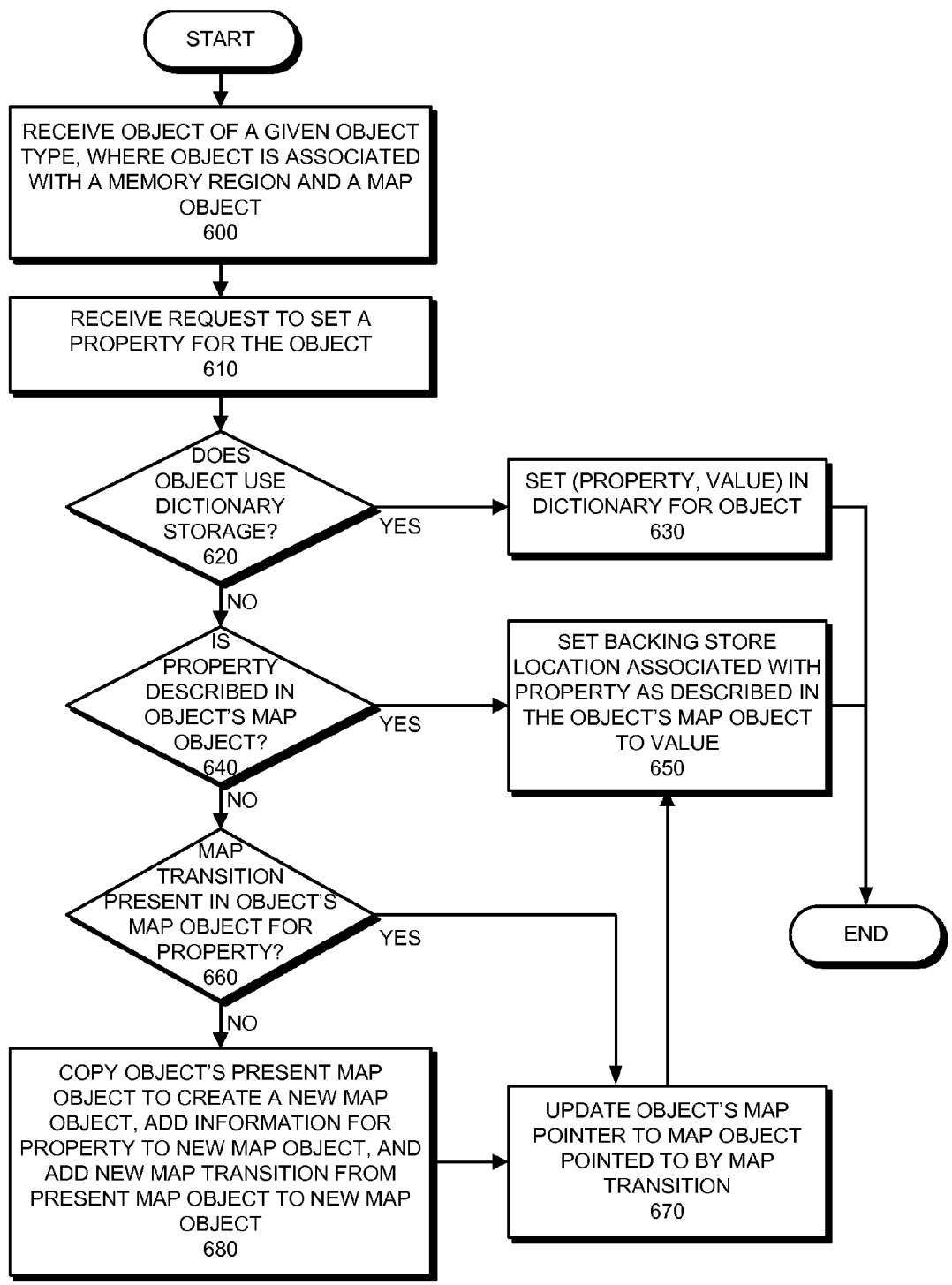
FIG. 6 presents a flow chart illustrating the process of using map objects to store properties for an object in a dynamic object-oriented programming language in accordance with an embodiment of the present invention.

FIG. 6 presents a flow chart illustrating the process of using map objects to store object properties for a program written in a dynamic object-oriented programming language. During operation, the system receives an object of a given object type (operation 600). This object is associated with a memory region and a given map object that describes how properties of the object are mapped to fields in the memory region. When the system receives a request to store a property for the object (e.g., a statement such as "<OBJECT>.<PROPERTY>=<VALUE>") (operation 610), the system first determines whether the given object uses dictionary storage (instead of map objects) for property access (operation 620). If the given object uses a dictionary technique, the system sets the pair (PROPERTY, VALUE) to the given object's dictionary (operation 630) and is done. Alternatively, if the given object uses map objects for property access (the 'NO' branch in operation 620), the system next checks whether the specified property can be accessed using information available in the object's present map object (operation 640). If so, the system can set the location in the backing store associated with the property (as described by the object's map object) to the specified value (operation 650), and is done. If the property is not described in the object's present map object, the system checks whether the present map object includes a map transition for the specified property (operation 660). If so, the system updates the object's map pointer to point to the map object identified by the map transition (operation 670) and then sets the backing store location specified in that map object to the specified value (operation 650). Finally, if no map transition is present (in operation 660), the system: copies the object's present map object to create a new map object; adds information for the property to the new map object; and then adds a new map transition from the present map object to the new map object (operation 680). After adding the new map object and the new map transition, the system updates the object's map pointer to point to the new map object (operation 670), and then sets the backing store location specified in the new map object to the specified value (operation 650).

Inline Caching Using Map Objects

The previous section describes how multiple objects of a given object type that access properties in substantially the same order can re-use and share existing map objects. In a program that allocates many substantially similar objects, such sharing of map objects can be used to facilitate inline caching during property accesses, thereby further improving performance. Inline caching is a compiler and/or runtime optimization technique that optimizes program code to improve runtime performance.

In one embodiment of the present invention, the system uses inline caching to dynamically re-write (or "patch") program code by assuming that a predicted map object will be associated with future object property accesses in a given section of the program code. For instance, during an initial execution of the program code for a given object, the system determines a specific map object being used to access a property of the object. The system then predicts that this map object will be associated with all future objects accessed in the same program code section, and patches the program code based on this prediction and the information in the map object. The system uses the information from the map object to patch the program code such that the program instructions directly access the field in the backing store of an object, thereby bypassing the lookup operation in the map object for each successive access.

Note that the above technique depends on the subsequent objects accessed by the patched program code using the same map object. To ensure that this prediction is correct, the system can check (e.g., at the beginning of the patched code segment) that the map object for the present object is indeed the same as the original map object with which the program code was patched. The system can verify this using a single compare operation. For instance, the system can embed the address of the pointer to the original map object in a branch-not-equal (BNE) instruction in the patched program code, and compare this with the address of the map object of a present object before executing the rest of the patched code for the present object. If the map object addresses are not the same, the BNE instruction jumps to the runtime system, which can re-patch the program code to the original program code to remove the optimization and restore the original map-object lookup. Hence, this check involves very low overhead.

Figure 7:
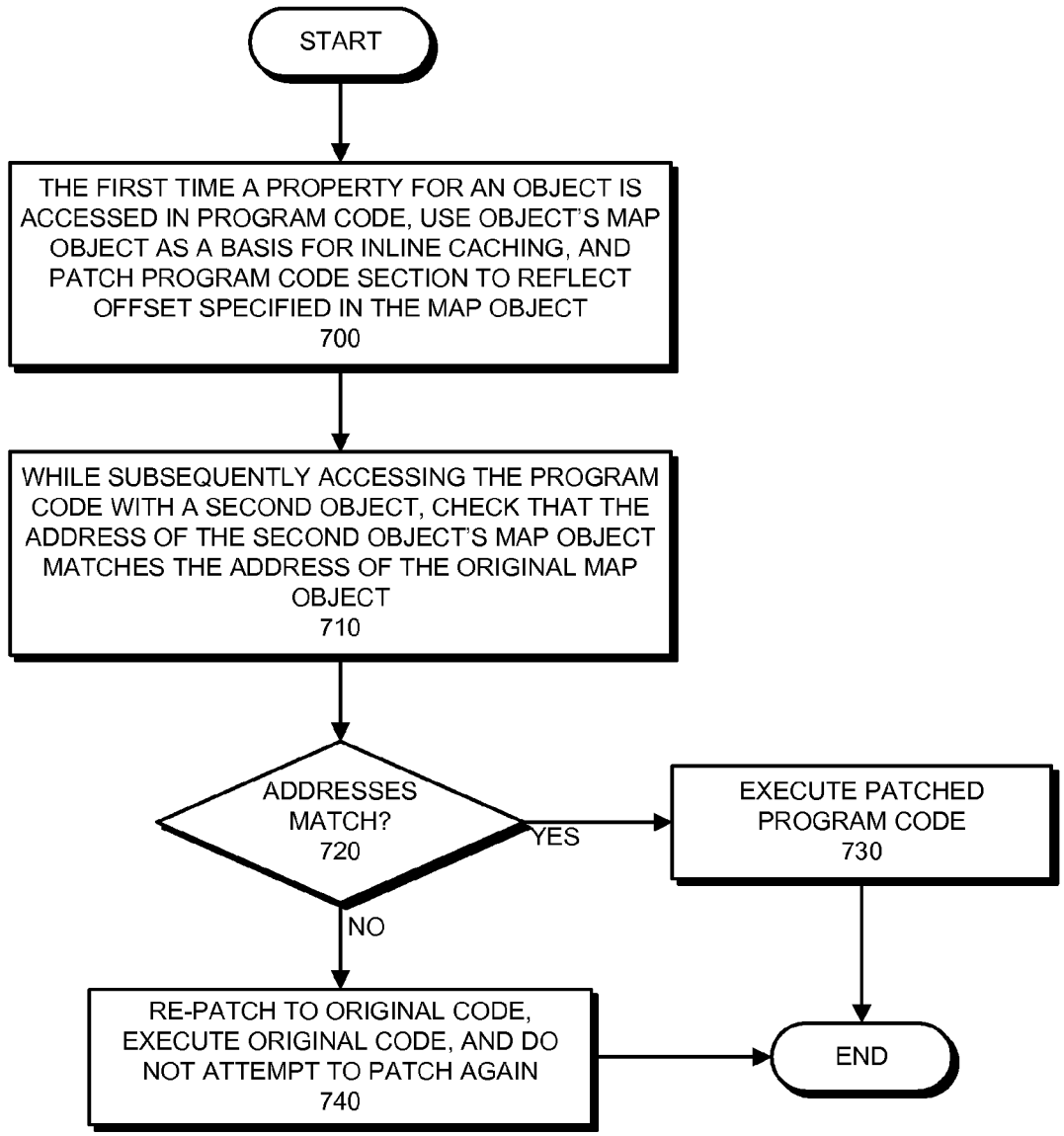
FIG. 7 presents a flow chart illustrating the process of using inline caching to access object properties in a program written in a dynamic object-oriented programming language in accordance with an embodiment of the present invention.

FIG. 7 presents a flow chart illustrating the process of using inline caching to access object properties in a program written in a dynamic object-oriented programming language. Note that the original program code is specified in a dynamic object-oriented programming language, and does not include any optimization hints. During operation, at a point where the system accesses a property for an object for the first time, the system uses an object's map object as the basis for inline caching, and patches the program code section to reflect the offset into the object's backing store that is specified in the map object (operation 700). Later, during a subsequent execution of the patched program code with a second object, the system checks that the address of the second object's map object matches the address of the original map object (operation 710). If the two addresses match (operation 720), the system executes the rest of the patched program code (operation 730), thereby using the patched program code to access the field in the backing store associated with the property directly without retrieving the property's offset in the associated map object. If, however, the addresses for the two map objects do not match, the system re-patches the program code section to the original code, executes the original code (thereby using the map object associated with the second object to explicitly determine the property's offset into the second object's backing store), and does not attempt to patch the program code section again (operation 740). Hence, the system starts out with un-optimized program code, and proceeds to optimize the program code during operation to improve performance for common object operations, where possible. When object use is regular, such optimizations can provide some of the benefits of static languages (e.g., C++ or Java), by making property access perform substantially similarly to static accesses with compiler-specified offsets.

Note that transitions between map objects can also be optimized using inline caching. For instance, patched code that assigns a value to a new property for an object can also include an additional instruction to assign the map pointer field in the object to the value of the new map pointer, thereby combining the map transition and assignment for a property into one operation. For example, for Object C 400 (of FIGS. 4A-4C), inline caching may be used to patch program code that points Object C's 400 map pointer 402 to map object M1 and writes the initial value for property X at the time of object creation, thereby bypassing the initial pointer to M0 and program code managing the subsequent map transition.

By using map objects and inline caching, the system optimizes for cases where the same type of object is frequently created and accessed in a substantially similar manner. Where previous implementations would need to create new (key, value) pairs for properties, and insert them into per-object-instance dictionaries, the described system instead uses shared maps and mostly eliminates per-object-instance dictionaries. These shared maps and the simpler per-instance backing store allow a smaller object size, and enable property access using a reduced number of instructions (as compared to dictionary techniques). The shared maps also facilitate using inline caching to further improve program performance. While some scenarios, such as using an object as an actual dictionary (e.g., storing a sequence of properties with random names in an object), do not follow such regular behavior, and revert to a slower dictionary backing store, such cases at worst perform no worse than existing dictionary implementations, and such cases are uncommon in structured programs.

Note that map objects are ordinary objects that can be garbage-collected similarly to other system objects. Hence, if no objects of a given type remain, and the map objects are no longer being used, the system can reclaim their associated space (e.g., via garbage collection). If more objects of the object type are subsequently created, the system can re-create the set of associated map objects as needed.

Note also that explicitly deleting properties is an uncommon operation in dynamic object-oriented programming languages. Properties are more likely to not be used again, in which case their associated storage space is reclaimed along with the rest of their associated object, for instance during garbage collection. Alternatively, when a property explicitly needs to be deleted for a given object, the system can change the associated object instance to use a dictionary technique (as described previously), and then remove the unwanted (property, value) pair from the object instance's dictionary. Because this change only occurs on a per-object-instance basis, the performance effect is limited if deletes are uncommon and results in worst-case performance no worse than existing dictionary implementations. Alternatively, if delete becomes a common operation, the system can also be extended to include the deletion of map transitions and/or map objects.

In summary, one embodiment of the present invention uses map objects to optimize the common case of defining and accessing object properties. The system uses map objects and transitions between map objects to capture the runtime transformation of objects, thereby reducing the overhead associated with property access, especially when compared to existing dictionary techniques. Furthermore, map objects facilitate class-based optimizations (such as inline caching) for systems where properties can be added dynamically. Because objects that are allocated using the same constructor often follow the same patterns for accessing properties, such optimizations can exploit regularity and thereby greatly improve the execution performance of dynamic object-oriented languages.

Metamorphic Function Lookups

In object-oriented systems, a given program code point may access properties for a wide range of different objects with different runtime types (e.g., perform a "megamorphic lookup"). For instance, during a virtual method invocation, upon encountering the virtual function call, the system fetches a function property for a given object and then proceeds to call the function. Such virtual function calls can occur frequently in object-oriented languages, such as when multiple different object types all support a function with the same given name. For example, a number of objects may all support a function that converts the respective contents of the object type into a string and then prints that string on a web page (e.g., a "toString( )" function substantially similar to those found in a number of object-oriented programming languages). During execution, an application may invoke such a function on a variety of potential objects, including strings, characters, integers, floating-point numbers, and other, more-complex objects. In general, supporting virtual function calls involves dynamic lookups at runtime. Given a property signature and an object type, the runtime system seeks to find a corresponding property (for a given object) as efficiently as possible.

Implementations of object-oriented systems often optimize such megamorphic lookups by using a hashed cache. For instance, a runtime system can use a hashed lookup table that maps runtime types and method signatures to find the right method to call for a given object type. At the time of a virtual function call, the system looks up the actual method to call in the table, and then invokes that method. In one such hashed cache implementation, the system maps (object type, method signature) pairs to specific methods by using a hash function to hash the object type and the method signature into an index into a global table whose entries can be used to find the corresponding method for a given object. To avoid errors due to hash collisions, the object type and method signature are also included in the table entries and are checked for validity before the method is executed. If this check reveals an invalid object type or method signature, the contents of the given entry are not used. In this situation, a more general and slower lookup-mechanism may be used to determine the correct method to call, after which the cache can be updated with corrected information.

One embodiment of the present invention extends the notion of such hashed caches to general property accesses. However, instead of storing method pointers, actual property values, or complicated descriptions of how to access values of object properties, the described system instead stores segments of program instructions in the hashed cache that can be executed to access object properties. Hashed caches containing such (executable) code stubs can be used to support inline caching to access object properties.

Using a Hashed Cache Containing Code Stubs for Property Access

One embodiment of the present invention uses a hashed cache to map runtime types and property signatures to dynamically-generated code stubs. These executable code stubs, which are customized based on a map object and a property signature, are used to implement efficient and flexible support for property access in dynamic object-oriented programming languages.

Figure 8:
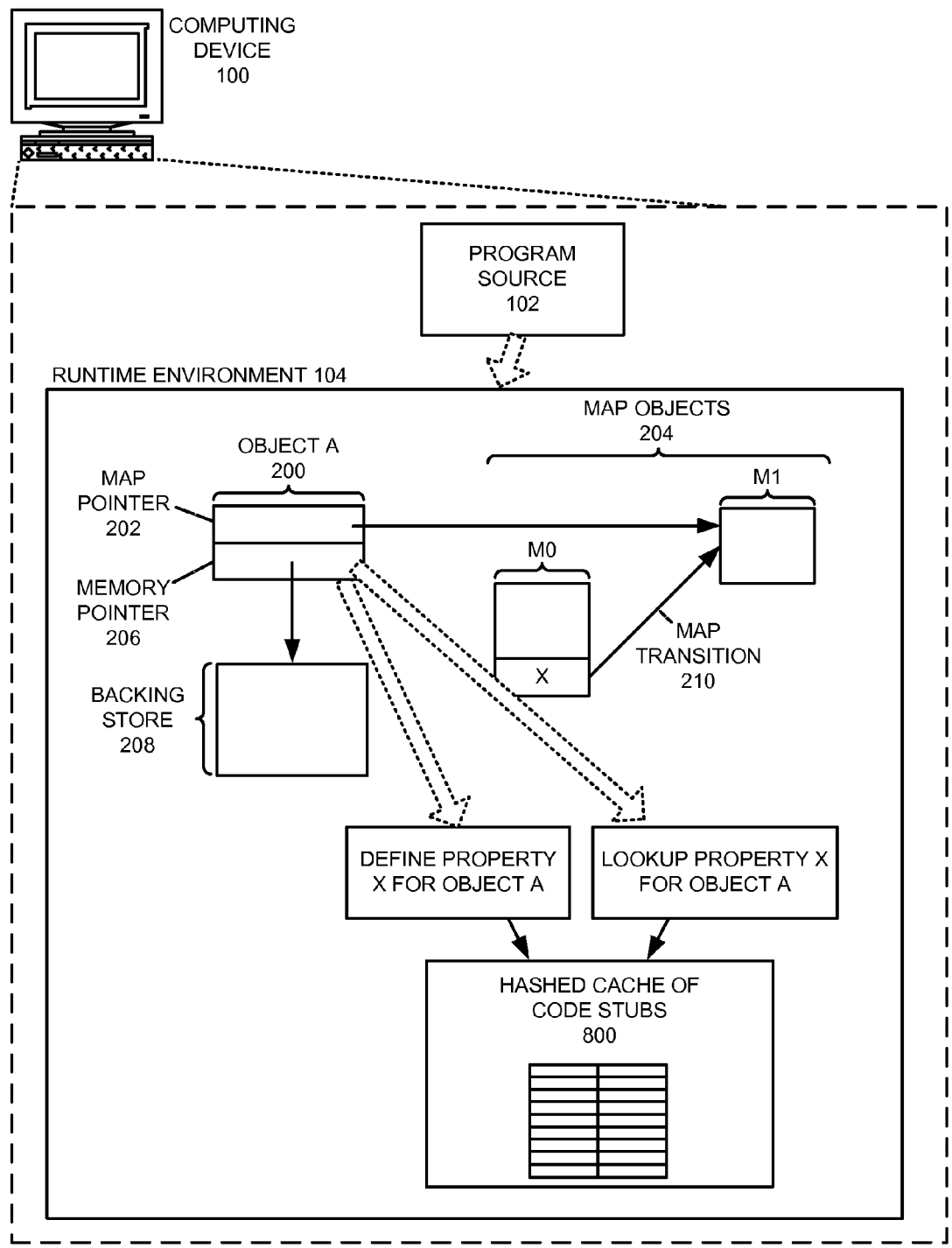
FIG. 8 illustrates an exemplary environment in which a program written in a dynamic programming language uses a hashed cache of code stubs during property definition and access operations in accordance with an embodiment of the present invention.

FIG. 8 illustrates an exemplary environment in which a program written in a dynamic programming language uses a hashed cache of code stubs 800 while defining and accessing properties. During operation, program source 102 for the program is loaded into runtime environment 104. Program source 102 defines and performs a number of operations upon Object A 200. Note that Object A 200 is defined as described previously (in FIG. 2 and the previous sections), including a map pointer 202 and memory pointer 206, and supports property access using map objects 204. However, the system now also uses one or more hashed caches of code stubs 800 while defining or accessing properties. The system does not store actual property values in the cache, but instead stores executable, dynamically-generated code stubs in the cache entries.

These code stubs can perform a number of validity checks and can perform the actual property access operations.

In one embodiment of the present invention, the system accesses a value for an object property by computing a hash index from the present runtime type of an object (as specified by the map object presently associated with the object) and a property signature, and then using this hash index to find an entry in the hashed cache. To ensure that collisions in the hashed cache table do not cause errors, the entry lookup procedure may include checks that ensure that the entry corresponds to the property signature for the object and property being accessed. For instance, entries in the hashed cache may include a cached value for the property signature associated with the given code stub, so that the system can check that the property signature being accessed matches the cached signature in the entry at the computed hash index. If the signature in the entry matches, the system can proceed to call the associated code stub. Otherwise, the system "misses" in the cache, and invokes a general lookup mechanism. The system uses this general lookup mechanism to determine how to access the property for the object's present runtime type (e.g., by checking the map object for the given object), and then generates and adds a new customized code stub for the property signature and map object pair to the hashed cache. Note that the runtime type for an object is distinct from the object type of the object. An object's object type is determined by the constructor function used to create the object, and indicates the (expandable) hierarchy of map objects that may apply to the object (e.g., the hierarchy of map objects 204 in FIG. 2 illustrates a set of map objects that may be used by multiple objects of the same object type to store properties relating to points in a coordinate system). Meanwhile, an object's runtime type is specified by the map object presently associated with the object, which indicates the specific set (and memory layout) of properties currently defined for the object. Multiple objects may simultaneously share the same runtime type (by all pointing to the same map object).

Table 1 illustrates pseudocode for a hashed cache lookup of a property X for an object A. In response to a property access (e.g., "A.X=3"), the system computes the hash of the runtime type of A and the signature (or text label) for property X ("X"), and uses the resulting hash value as an index into a hashed cache (or hash table). The system then checks that the signature in the table entry matches the property signature ("X") before returning (and executing) the associated code stub for the entry.

TABLE 1

```
hash = ComputeHash(typeof(A), "X");
index = hash % table.length;
entry = table[index];
if (entry.signature == "X") {
    return Invoke(entry.code, A);
} else {
    return Miss(typeof(A), "X");
}
```

Table 2 illustrates pseudocode for a "miss" function that is executed when the property signature and cached signature do not match (e.g., in the conditional statement in Table 1). This miss function performs a "slow lookup" (e.g., a lookup using the general lookup mechanism) to find a description for the property being loaded. The function then generates a new code stub customized to the property signature of property X and the present runtime type of Object A (e.g., the present map object associated with Object A), and inserts the resulting code stub into a new table entry at the computed hash index. Finally, the function uses this description to access the desired property. Note that all code stubs can be generated at runtime, as needed. If the system looks up a hash index and cannot find an entry that matches the desired signature, the system generates a code stub that fits the scenario and inserts this code stub into the hashed cache at the computed hash index. Hence, the new entry is available for the next access of that property for any object associated with the given map object, causing the next access to be substantially optimized.

TABLE 2

```
function Miss(type, signature) {
    description = LookupPropertyDescription(type, signature);
    entry = new Entry(signature, GenerateCodeStub(description));
    table[ComputeHash(type, signature) % table.length] = entry;
    return GetPropertyValue(description);
}
```

Table 3 illustrates exemplary pseudocode for a generated code stub. This generated code stub may be customized to include additional checks and access methods for a memory field associated with the desired property (e.g., a field in the memory backing store specified by a given map object). The pseudocode shown in Table 3 performs an additional validity check to ensure that the object's map object matches the map object used when generating the code stub. If the map objects do not match, the system generates a miss (as described previously for Tables 1-2). If the map objects match, the system executes the code stub, which includes program instructions for accessing the property. For instance, in Table 3, the code stub returns the value for the property X for the given object by accessing the correct offset in the given object's memory backing store. Note that the system includes this offset in the code stub at the time that the code stub is generated for the given object's map object.

TABLE 3

```
function CustomizedGetter(object) {
    // Check validity of object type with customized type in stub
    if (typeof(object) != <<customized map>>) {
        return Miss(typeof(object), X);
    }
    // Return the value of the 'X' property.
    return object[<<offset of X in objects with customized map>>];
}
```

Note that the code stubs in the hashed cache store actual program instructions that perform property accesses, as opposed to storing more general descriptions of how to access properties. This program code can include additional checks, for instance to perform additional validity and/or security checks for map objects and/or properties. The described techniques allow the system to add additional checks or actions for specific runtime types and/or properties without slowing down property accesses for other runtime types and properties. For instance, per-property or per-object checks can be included in a web browser application that efficiently restricts access to objects across frames with different origins (e.g., to enforce a "same origin policy" that prevents pages loaded from one origin from getting or setting properties for pages loaded from a different origin). In another example, the code stubs can be extended to also perform map transitions when a new property is created for a given object. In this scenario, the code stub creating a property for an object might perform the map transition (e.g., updating the map pointer for the object) as well as the actual assignment of the value for the property. For example, to add a property X to Object A 200 (as illustrated in FIGS. 2A-2B), a code stub associated with an entry for the hash index derived from map object M0 and property signature "X" may, after checking the validity of the property signature and map pointer 202 to point to map object M1 and then write the specified value for property X to the correct offset in backing store 208. Note that the set of checks may be implemented using a variety of fields in the entries of the hashed cache as well as instructions in the code stubs themselves.

Figure 9:
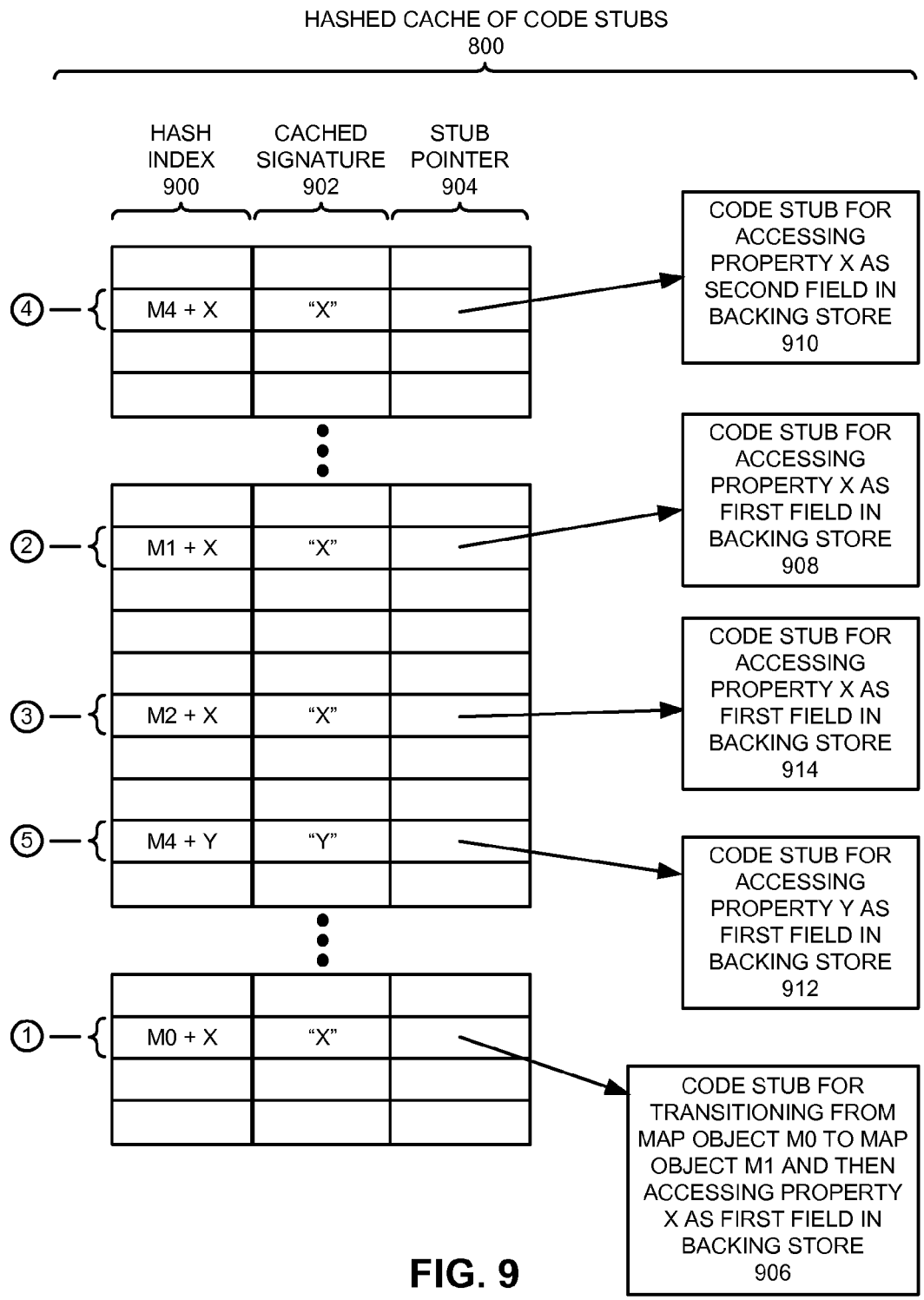
FIG. 9 illustrates a hashed cache of code stubs that includes cache entries and codes stubs for a subset of the property accesses and the map objects and properties described in FIGS. 2A-4C in accordance with an embodiment of the present invention.

FIG. 9 illustrates a hashed cache of code stubs 800 that includes cache entries and codes stubs for a subset of the map objects, properties, and property accesses illustrated in FIGS. 2A-4C. Each entry (or row) in the hashed cache includes a hash index 900, a cached signature 902, and a stub pointer 904 that points to a code stub associated with the entry. During operation, when the system encounters a property access for a property X of an object of runtime type M0, the system checks whether an entry is available at the hash index associated with M0 and property signature "X". Note that the system can use a wide range of hash functions in setting and determining the hash index 900 of entries. For instance, a simple hash function that adds the address of the given map object and the value of the symbol for the desired property may give a sufficient distribution that can be computed using minimal computational effort. The system can, for instance, combine the two values and then scale down the resulting value to fit to the hashed cache table. Alternatively, a more complex hash function may use additional instructions upon the set of map objects and property signatures to attempt to achieve a more balanced distribution of hash indices.

The first access of a property X for a given object of runtime type M0 typically results in a miss to the hashed cache. During the lookup process, the system creates a code stub for this type of property access (e.g., for this given map object and property signature), and creates an entry in the hashed cache at the computed hash index 900 (in this case "M0+X", where the hash value is computed using the additive hash function described above, resulting in a hash index corresponding to entry 1 in FIG. 9) that includes as a cached signature 902 "X" and a stub pointer 904 pointing to code stub 906. Code stub 906 includes instructions for transitioning from map object M0 to map object M1 and then accessing property X as the first field in the given object's backing store (as described for FIGS. 2A-2B). During an actual property access (for this type), the system checks that the property signature matches the cached signature (in this case, "X"), and then, during the execution of the code stub (e.g., in the instructions of the code stub), also checks that the given object's map object matches the map object used when generating code stub.

A subsequent access to the property X for the given object above (now of type M1) results in a different hash index 900, "M1+X" (shown as entry 2 in FIG. 9), due to the updated (different) map object now associated with the given object. During a first property access for the property X for an object with runtime type M1, a miss for the hashed cache 800 generates a code stub that knows how to access the property X for objects associated with the M1 map object. Specifically, the system: creates a corresponding entry at the computed hash index (now "M1+X"); writes "X" into the cached signature 902 field; creates a corresponding code stub 908; and adds a stub pointer 904 into the entry pointing to code stub 908. Note that code stub 908 differs from code stub 906, in that code stub 908 accesses an already-created property, and hence does not need to include any instructions for performing a map transition. During a property access for property X for a given object of runtime type M1, code stub 908 provides instructions that access property X as the first field in the backing store of the given object.

If a later operation creates a property Y for the above given object, the system updates the given object's map pointer 202 to point to map object M2 (as shown in FIG. 2C), so that a subsequent access to property X for the given object generates a hash index 900 of "M2+X" (shown as entry 3 in FIG. 9), which may result in another miss and the generation of an entry and code stub for this type of property access as well. Note that the generated code stub for this new entry will be substantially similar to that for "M1+X" (entry 2 in FIG. 9) in functionality, because property accesses for both runtime types access property X as the first field in the given object's backing store. In one embodiment, the system can create two entries that share a single code stub as an optimization, but this organization might complicate the automatic generation of map-object-checking code. In another embodiment, the system generates two separate (but substantially similar) code stubs for these operations (e.g., code stubs 908 and 914 in FIG. 9).

Note that while individual code stubs may not be shared across multiple map objects, many objects (that point to the same map object) may trigger the execution of the code stub in a given cache entry. However, the code stub cache does not manage this sharing. Instead, the system enables sharing at the map object level; a large number of objects can point to any given map object, and each given map object typically serves as the single pointer to an associated cache entry (for a given property accessed using that given map object). Hence, unlike other caching approaches where the cache system actively manages sharing, and cache entries might accidentally not be shared due to conditions in the cache, the described system enables automatic sharing of code stubs through map object data structures.

Returning to the description of FIG. 9, note that accessing a property X for a given object with runtime type M4 (from FIG. 3C, where the property Y was created for the given object before the creation of the property X for the given object) results in a different code stub 910, which needs to access property X as the second field in the backing store of a second given object (of runtime type M4). Upon the first access of property X for an object of runtime type M4, the system creates a new entry for this code stub 910 (shown as entry 4 in FIG. 9, with a hash index 900 "M4+X"). The different hash indices and checks included in codes stubs 910 and 908 ensure that objects with different runtime types (e.g., objects associated with map object M4 for code stub 908, and objects associated with map objects M1/M2 for code stub 910) cannot erroneously execute an incorrect code stub that does not match their respective runtime type.

FIG. 9 also illustrates a hashed cache 800 entry for another property, property Y for the runtime type M4. Property Y's different signature ("Y") results in a different hash index 900 and entry than for property X in association with map object M4 (e.g., entry 5 in FIG. 9 for "M4+Y" vs. entry 4 in FIG. 9 for "M4+X"). The entry for accessing an already-created property Y for a given object of runtime type M4 points to a code stub 912 that accesses property Y as the first field in the second given object's backing store. Note that FIG. 9 illustrates only a representative subset of the properties and runtime types shown in FIGS. 2A-4C.

Note that a read access and a write access for the same property X for a given object of runtime type M1 may involve different sets of instructions, and hence may need two different code stubs. In one embodiment of the present invention, the system can support multiple types of property access for a given property and runtime type. For instance, the system may support multiple types of property access (such as loads and stores) by: considering the type of property access in the hash function, so that the different types of property access map to different hash indices; adding and checking additional fields in the entry to determine the corresponding code stub for a given type of property access; maintaining multiple parallel hashed caches for different types of property access; and/or by checking for the type of property access in the actual instructions of the code stub, and executing the appropriate instructions for the determined type of property access.

Note that while map transitions may seem to involve substantial complexity and/or overhead, such transitions are typically only actually used when writing a new property for the first time for a given object. In many programs, writes are infrequent compared to reads; hence, incurring additional overhead for an initial write typically does not involve substantial additional overhead when amortized across a number of following accesses. New map objects only need to be generated the first time a new property is written for an associated map object, and not when adding a similar property in the same order for a later object or for re-setting an already-existing property for an object. Furthermore, by using a code stub cache, the system can further reduce the overhead of map transitions such that there is only an additional overhead for the first time a property is accessed for each given map object, after which the generated code stub for the combination facilitates optimized property access. Such techniques can provide substantial speed-ups in program execution over traditional dictionary approaches.

Note also that a series of property accesses can be detected by the language compiler (e.g., an on-the-fly compiler present in the runtime environment), so that, when possible, the system can group multiple map transitions for an object into a single transition. For instance, for a code segment that sets initial values for three properties of a new object (e.g., "A.X=3; A.Y=5; A.Z=23;"), the system may create a code stub that skips the two initial transitions (for properties X and Y) and instead: (1) transitions immediately to a map object M5 that supports properties, X, Y, and Z; and (2) writes values for all three properties to the backing store for the given object. Hence, in one embodiment of the present invention the system can be configured to generate more sophisticated and optimized code stubs when it detects scenarios in which such additional optimizations can be made.

Figure 10:
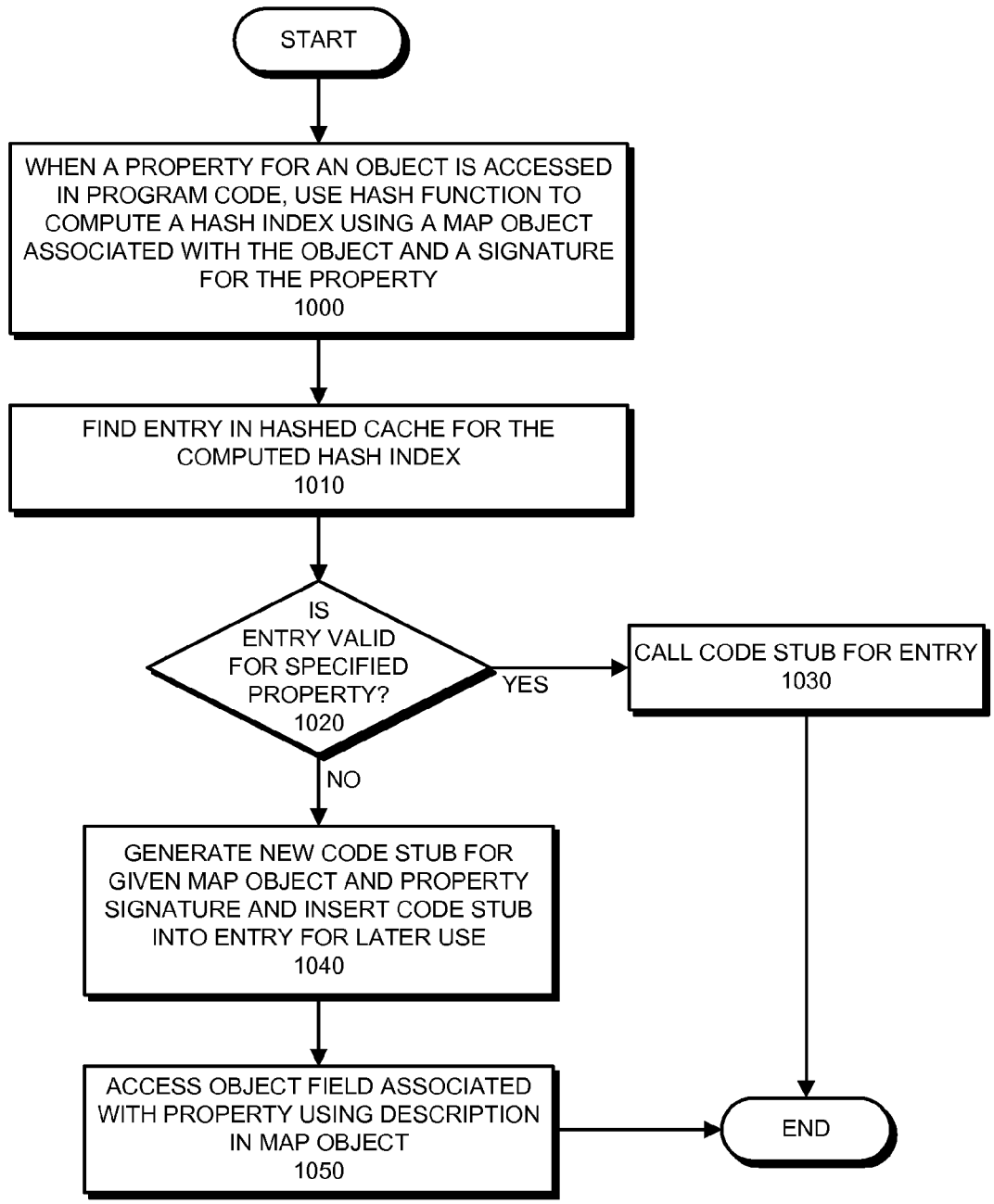
FIG. 10 presents a flow chart illustrating the process of using a hashed cache to access a property for an object in accordance with an embodiment of the present invention.

FIG. 10 presents a flow chart illustrating the process of using a hashed cache to access a property for an object. During operation, when program code tries to access a property for a given object, the system uses a hash function to compute a hash index based on a map object associated with the object and a signature for the property (operation 1000). The system then uses this computed hash index to find an entry in a hashed cache of code stubs (operation 1010). If this entry is valid for the specified property (e.g., a cached signature in the entry matches the property's signature) (operation 1020), the system executes a code stub associated with the entry (operation 1030), thereby performing the property access for the object. If the entry is not valid for the specified property, the system generates a new code stub for the entry associated with the given map object and property signature, and inserts this new code stub into the entry (at the computed hash index) for later use (operation 1040). The system then completes the property access by using the description in the map object to access the offset in the objects' backing store associated with the property (operation 1050).

In summary, in one embodiment of the present invention code stubs and map objects provide flexible mechanisms for handling property access for objects, and can be used to optimize the reading and writing of properties as well as function invocations. A hashed cache of code stubs, combined with a set of map objects that (among other things) can be used to guarantee that code stubs are executed for the correct runtime types, and can facilitate extending property access on a per-type, per-signature basis. Hence, the described system provides customized property access techniques that can be used both to call functions as well as to efficiently set and access property values. Furthermore, the described techniques can be used to facilitate inline caching.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using map objects to access properties of an object in a dynamic object-oriented programming language, wherein dynamic object-oriented programming languages allow additional properties to be defined for objects during execution, comprising:
  receiving an object of a given object type, wherein the object is associated with, a memory region and a given map object in a set of map objects associated with the given object type;
  wherein the given map object describes how properties of the object are mapped to fields in the memory region, and wherein the set of map objects are linked hierarchically using a set of map transitions based on the order in which properties are defined for one or more objects of the given object type;
  receiving a request to access a property for the object;
  determining, by a computing device, whether the given map object includes a mapping for the property;
  if the given map object includes a mapping for the property, accessing, by the computing device, a field associated with the property using the mapping;
  if the given map object does not include the mapping for the property, determining, by the computing device, whether a direct descendant of the given map object includes the mapping for the property;
  if a direct descendant of the given map object includes the mapping for the property:
  determining, by the computing device, a descendant map object for the given map object that maps the property to a new field in the memory region;
  wherein the descendant map object is the direct descendant of the given map object which includes substantially the same field mappings as the given map object, and
  wherein an additional field mapping for the property is added to the field mappings that are defined for the given map object;
  updating, by the computing device, the object to be associated with the descendant map object; and
  accessing, by the computing device, the new field associated with the property using the mapping in the descendant map object; and
  if no direct descendant of the given map object includes the mapping for the property:
  allocating, by the computing device, a new map object that defines a new field in the memory region for the property in addition to the fields defined for the properties of the given map object;

creating, by the computing device, a new map transition that adds the new map object to the hierarchical set of map objects as a direct descendant of the given map object; and updating, by the computing device, the object to be associated with the new map object.

2. The method of claim 1, wherein the number of map objects that can be allocated as new properties are defined for a given object type is limited; and wherein when the properties defined for the object exceed a given limit, a dictionary-storage technique is used to facilitate accessing properties of the object in place of the set of map objects, and property-value pairs from an associated dictionary are accessed when accessing properties for the object.

3. The method of claim 1, wherein additional objects of the given object type that access properties in the same order as the object do not need to allocate new map objects, but can instead re-use existing map objects; and wherein sharing map objects across one or more objects facilitates using inline caching to improve performance.

4. The method of claim 3, further comprising using the set of map objects to predict a typical number of properties expected for the given object type, whereby predicting the typical number of properties facilitates choosing an initial size for the memory region.

5. A non-transitory computer-readable storage medium storing instructions that when executed by a computer cause the computer to perform a method for using map objects to access properties of an object in a dynamic object-oriented programming language, wherein dynamic object-oriented programming languages allow additional properties to be defined for objects during execution, the method comprising:

receiving an object of a given object type, wherein the object is associated with a memory region and a given map object in a set of map objects associated with the given object type;

wherein the given map object describes how properties of the object are mapped to fields in the memory region, and wherein the set of map objects are linked hierarchically using a set of map transitions based on the order in which properties are defined for one or more objects of the given object type;

receiving a request to access a property for the object;

determining whether the given map object includes a mapping for the property;

if the given map object includes a mapping for the property, accessing a field associated with the property using the mapping;

if the given map object does not include the mapping for the property, determining whether a direct descendant of the given map object includes the mapping for the property;

if a direct descendant of the given map object includes the mapping for the property:

determining a descendant map object for the given map object that maps the property to a new field in the memory region; wherein the descendant map object is the direct descendant of the given map object which includes substantially the same field mappings as the given map object, and wherein an additional field mapping for the property is added to the field mappings that are defined for the given map object;

updating the object to be associated with the descendant map object; and accessing the new field associated with the property using the mapping in the descendant map object; and if no direct descendant of the given map object includes the mapping for the property:

allocating a new map object that defines a new field in the memory region for the property in addition to the fields defined for the properties of the given map object;

creating a new map transition that adds the new map object to the hierarchical set of map objects as a direct descendant of the given map object; and updating the object to be associated with the new map object.

6. The non-transitory computer-readable storage medium of claim 5, wherein the number of map objects that can be allocated as new properties are defined for a given object type is limited; and wherein when the properties defined for the object exceed a given limit, a dictionary-storage technique is used to facilitate accessing properties of the object in place of the set of map objects, and property-value pairs from an associated dictionary are accessed when accessing properties for the object.

7. The non-transitory computer-readable storage medium of claim 5, wherein additional objects of the given object type that access properties in the same order as the object do not need to allocate new map objects, but can instead re-use existing map objects; and wherein sharing map objects across one or more objects facilitates using inline caching to improve performance.

8. The non-transitory computer-readable storage medium of claim 7, further comprising using the set of map objects to predict a typical number of properties expected for the given object type, whereby predicting the typical number of properties facilitates choosing an initial size for the memory region.

9. An apparatus that uses map objects to access properties of an object in a dynamic object-oriented programming language, wherein dynamic object-oriented programming languages allow additional properties to be defined for objects during execution, comprising:

a receiving mechanism configured to receive an object of a given object type, wherein the object is associated with a memory region and a given map object in a set of map objects associated with the given object type;

wherein the given map object describes how properties of the object are mapped to fields in the memory region, and wherein the set of map objects are linked hierarchically using a set of map transitions based on the order in which properties are defined for one or more objects of the given object type;

wherein the receiving mechanism is further configured to receive a request to access a property for the object;

a determining mechanism, implementing on a computing device, configured to determine whether the given map object includes a mapping for the property;

an access mechanism, implementing on the computing device, configured to access a field associated with the property using the mapping when the given map object includes the mapping for the property;

wherein the determining mechanism is further configured to determine a descendant map object for the given map object that maps the property to a new field in the memory region when the given map object does not include a mapping for the property and a direct descendant of the given map object includes mapping for the property, wherein the descendant map object is the direct descendant of the given map object which includes substantially the same field mappings as the given map object, and wherein an additional field mapping for the property is added to the field mappings that are defined for the given map object;

an update mechanism, implementing on the computing device, configured to update the object to be associated with the descendant map object when a direct descendant of the given map object includes mapping for the property;

wherein the access mechanism is further configured to access the new field associated with the property using the mapping in the descendant map object;

an allocating mechanism, implementing on the computing device, configured to allocate a new map object that defines a new field in the memory region for the property in addition to the fields defined for the properties of the given map object when no direct descendant of the given map object includes mapping for the property; and a map transition mechanism, implementing on the computing device, that creates a new map transition that adds the new map object to the hierarchical set of map objects as a direct descendant of the given map object when no direct descendant of the given map object includes the mapping for the property;

and wherein the update mechanism is configured to update the object to be associated with the new map object.

* * * * *